United States Patent
Naito et al.

(10) Patent No.: US 12,441,244 B2
(45) Date of Patent: Oct. 14, 2025

(54) DOOR MIRROR ROTATION CONTROL DEVICE AND DOOR MIRROR ROTATION CONTROL METHOD

(71) Applicant: Honda Motor Co., Ltd., Tokyo (JP)

(72) Inventors: Tatsuya Naito, Tokyo (JP); Mutsuki Hirooka, Tokyo (JP); Kazuhiko Kameda, Tokyo (JP); Yuichi Yoshii, Tokyo (JP); Takuro Hashimoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 104 days.

(21) Appl. No.: 18/587,882

(22) Filed: Feb. 26, 2024

(65) Prior Publication Data

US 2024/0326693 A1     Oct. 3, 2024

(30) Foreign Application Priority Data

Mar. 29, 2023   (CN) .......................... 202310319415.4

(51) Int. Cl.
*B60R 1/074*     (2006.01)
*B60R 1/06*      (2006.01)

(52) U.S. Cl.
CPC ............... *B60R 1/074* (2013.01); *B60R 1/06* (2013.01); *B60R 1/0612* (2013.01)

(58) Field of Classification Search
CPC ......... B60R 1/074; B60R 1/07; B60R 1/0625; B60R 1/062; B60R 1/06; B60R 1/0602;
(Continued)

(56) References Cited

U.S. PATENT DOCUMENTS 3,711,179 A * 1/1973 Takeda .................. B60R 1/0602
                                             52/171.2
5,155,625 A * 10/1992 Komatsu ............... B60R 1/0602
                                             359/507
(Continued)

FOREIGN PATENT DOCUMENTS

CN           209191804 U  *  8/2019
CN           112758016 A  *  5/2021  ............. B60R 1/074
(Continued)

OTHER PUBLICATIONS

Mira Esculenta M, Sugeng Hadi Susilo, Asrori A, Lulut W. "Automatic Mirror Folding design Arduino-Based." Jul. 2021. Logic: Journal of Engineering Design and Technology. vol. 21. No. 2. pp. 93-96. (Year: 2021).*

(Continued)

*Primary Examiner* — Russell Frejd
*Assistant Examiner* — Hyang Ahn
(74) *Attorney, Agent, or Firm* — JCIPRNET

(57) ABSTRACT

A door mirror rotation control device includes a control part controlling drive of a motor to cause a door mirror to switch between a folded status and an unfolded status. The control part includes a motor drive controller controlling drive of the motor and a motor action determination part determining a drive content of the motor. The motor action determination part detects raindrop information during drive of the motor, and determines the drive content of the motor as a normal action or a specific action based on whether the raindrop information is acquired. Compared to the normal action, a frequency of rotation changes of the motor during a period until drive of the motor ends is high in the specific action. The motor drive controller is configured to control drive of the motor in the normal action or the specific action determined by the motor action determination part.

8 Claims, 12 Drawing Sheets

(58) Field of Classification Search
CPC ... B60R 1/0612; B60R 1/0615; B60R 1/0607;
B60R 1/0605; B60R 1/0617; B60R 1/076;
B60R 1/08; B60R 2001/1223; A01D
67/02; A47C 7/66; B60Q 2300/312;
B32B 2307/712; G10H 2250/415
See application file for complete search history.

(56) References Cited

U.S. PATENT DOCUMENTS

2017/0113615 A1* 4/2017 Fendt .................. B60K 35/23
2017/0158136 A1* 6/2017 Garcia Solache ........ B60R 1/07

FOREIGN PATENT DOCUMENTS

| JP | 2018047730 | | 3/2018 | | |
|----|------------|----|--------|----|----|
| JP | 2020066311 | | 4/2020 | | |
| KR | 100188609 | B1 * | 6/1999 | ............. | B60R 1/081 |

OTHER PUBLICATIONS

Christian Scharfenberger, Samarjit Chakraborty, John Zelek, David Clausi. "Motion Stereo-based Collision Avoidance for an Intelligent Smart Car Door System." Sep. 2012. 2012 15th International IEEE Conference on Intelligent Transportation Systems. pp. 1383-1389. (Year: 2012).*

* cited by examiner

DOOR MIRROR ROTATION CONTROL DEVICE AND DOOR MIRROR ROTATION CONTROL METHOD

CROSS-REFERENCE TO RELATED APPLICATION

This application claims the priority benefit of China application serial no. 202310319415.4, filed on Mar. 29, 2023. The entirety of the above-mentioned patent application is hereby incorporated by reference herein and made a part of this specification.

BACKGROUND

Technical Field

The disclosure relates to a door mirror rotation control device and a door mirror rotation control method.

Related Art

Door mirrors are mounted on a vehicle to reflect road conditions on both the left and right sides and the rear side so that a driver can monitor safety conditions on both the left and right sides and the rear side with the door mirrors. With the development of technology, the door mirror disposed on the vehicle has evolved to be automatically controlled, and the door mirror can be automatically adjusted to an unfolded status or a folded status based on outputs of various sensors installed on the vehicle. In addition, to accommodate the need of the driver for switching the status of the door mirror in some situations, the driver can also manually operate a predetermined button to fold or unfold the door mirror.

For example, Japanese Patent Application Laid-Open No. 2020-66311 (Patent Document 1) discloses a control device that can easily switch the door mirror when the driver wishes to temporarily switch the door mirror to the folded status or the unfolded status. After the temporary switch time ends, the door mirror returns to its original status and resumes control in an automatic mode. The art of Patent Document 1 is intended to make it possible to easily perform the operation of temporarily switching the status of the door mirror.

However, in situations of rain, raindrops attach to the mirror surface of the door mirror, which leads to a decrease in visibility during movement of the vehicle.

SUMMARY

According to an embodiment of the disclosure, a door mirror rotation control device includes a control part controlling drive of a motor to cause a door mirror to switch between a folded status and an unfolded status. The control part includes a motor drive controller and a motor action determination part. The motor drive controller is configured to control drive of the motor. The motor action determination part is configured to determine a drive content of the motor. The motor action determination part is configured to detect raindrop information during drive of the motor, and determine the drive content of the motor as a normal action or a specific action based on whether the raindrop information is acquired. Compared to the normal action, a frequency of rotation changes of the motor during a period until drive of the motor ends is high in the specific action. The motor drive controller is configured to control drive of the motor in the normal action or the specific action determined by the motor action determination part.

According to another embodiment of the disclosure, a door mirror rotation control method is executed by a control part, the control part including a motor drive controller and a motor action determination part. The door mirror rotation control method includes steps below. A motor is driven by the motor drive controller to cause a door mirror to switch between a folded status and an unfolded status. Raindrop information during drive of the motor is detected by the motor action determination part. A drive content of the motor is determined by the motor action determination part as a normal action or a specific action based on whether the raindrop information is acquired. Compared to the normal action, a frequency of rotation changes of the motor during a period until drive of the motor ends is high in the specific action. Drive of the motor is controlled by the motor drive controller in the normal action or the specific action determined by the motor action determination part.

DESCRIPTION OF EMBODIMENTS

Figure 1:
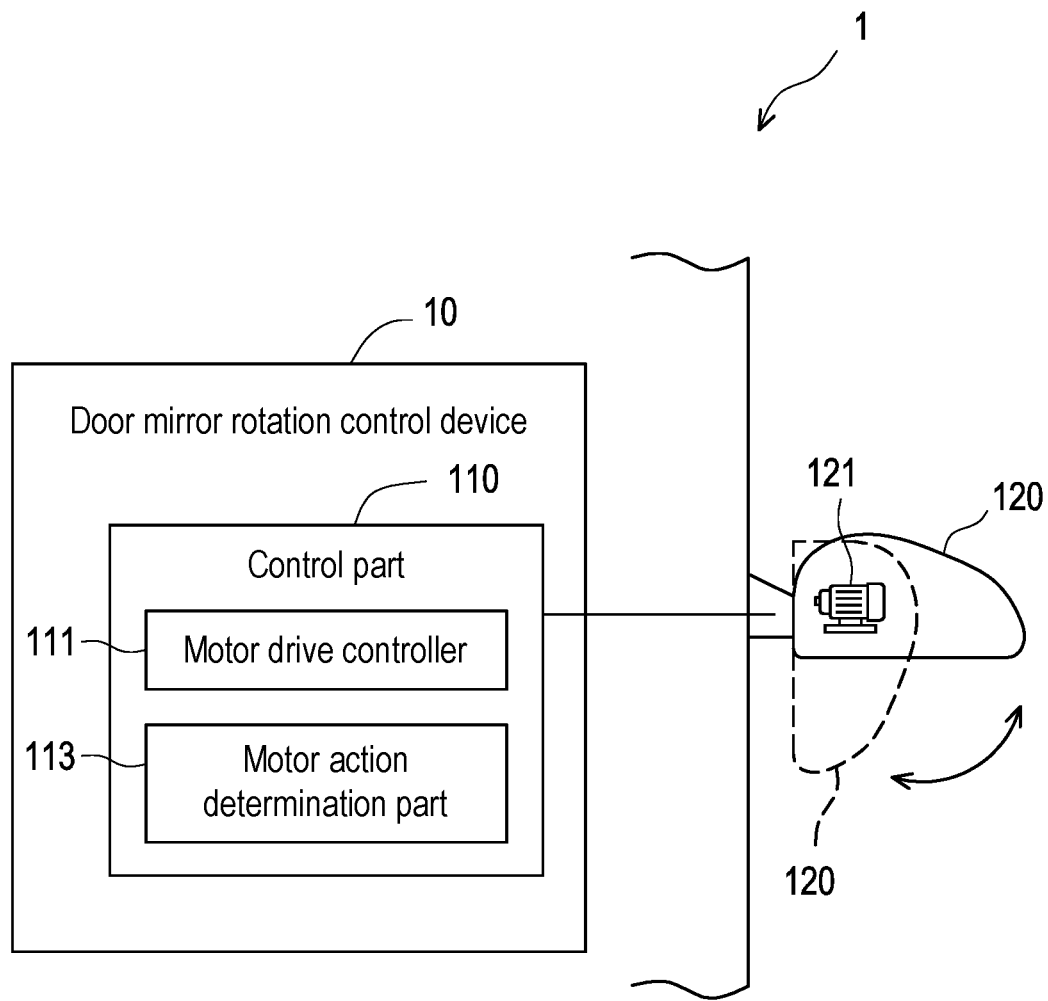
FIG. 1 is a schematic view of a part of a vehicle mounted with a door mirror rotation control device and a door mirror according to an embodiment of the disclosure.

Embodiments of the disclosure provide a door mirror rotation control device and a door mirror rotation control method capable of improving visibility during movement of the vehicle to thereby improve traffic safety and contribute to development of sustainable transportation systems.

According to an embodiment of the disclosure, a door mirror rotation control device includes a control part controlling drive of a motor to cause a door mirror to switch between a folded status and an unfolded status. The control part includes a motor drive controller and a motor action determination part. The motor drive controller is configured to control drive of the motor. The motor action determination part is configured to determine a drive content of the motor. The motor action determination part is configured to detect raindrop information during drive of the motor, and determine the drive content of the motor as a normal action or a specific action based on whether the raindrop information is acquired. Compared to the normal action, a frequency of rotation changes of the motor during a period until drive of the motor ends is high in the specific action. The motor drive controller is configured to control drive of the motor in the normal action or the specific action determined by the motor action determination part.

In the door mirror rotation control device according to an embodiment of the disclosure, the drive content of the motor determined by the motor action determination part is related to a rotational speed of the motor. The specific action includes an action of repeatedly switching the rotational speed between high speed rotation and low speed rotation.

In the door mirror rotation control device according to an embodiment of the disclosure, the drive content of the motor determined by the motor action determination part is related to a rotation action of the motor. The specific action includes an action of repeatedly switching the rotation action between rotation and stop.

In the door mirror rotation control device according to an embodiment of the disclosure, the drive content of the motor determined by the motor action determination part is related to a rotation direction of the motor. The specific action includes an action of repeatedly switching the rotation direction between forward rotation and reverse rotation.

In the door mirror rotation control device according to an embodiment of the disclosure, the drive content of the motor determined by the motor action determination part is related to a rotation action of the motor. The specific action includes an action of repeatedly switching the rotation action between a folding action and an unfolding action of the door mirror.

In the door mirror rotation control device according to an embodiment of the disclosure, the control part is configured to estimate whether a vehicle will drive within a predetermined time. Compared to a case of driving within the predetermined time, in a case of determining that the vehicle will not drive within the predetermined time, the frequency of the rotation changes of the motor is high, or an amount of the rotation changes of the motor is large.

In the door mirror rotation control device according to an embodiment of the disclosure, the motor action determination part is configured to acquire a stop duration of a vehicle, and determine drive of the motor to perform the specific action in a case where the stop duration is greater than or equal to a preset duration and the raindrop information has been acquired.

According to an embodiment of the disclosure, a door mirror rotation control method is executed by a control part, the control part including a motor drive controller and a motor action determination part. The door mirror rotation control method includes steps below. A motor is driven by the motor drive controller to cause a door mirror to switch between a folded status and an unfolded status. Raindrop information during drive of the motor is detected by the motor action determination part. A drive content of the motor is determined by the motor action determination part as a normal action or a specific action based on whether the raindrop information is acquired. Compared to the normal action, a frequency of rotation changes of the motor during a period until drive of the motor ends is high in the specific action. Drive of the motor is controlled by the motor drive controller in the normal action or the specific action determined by the motor action determination part.

Based on the above, the disclosure is capable of changing rotation of the motor of the door mirror to control opening and closing of the door mirror and thereby shake off (remove) the raindrops attached to the door mirror in the case where raindrop information has been detected.

Detailed reference will now be made to the exemplary embodiments of the disclosure, examples of which are illustrated in the accompanying drawings. Wherever possible, the same reference signs are used in the drawings and the description to refer to the same or similar parts.

FIG. 1 is a schematic view of a part of a vehicle mounted with a door mirror rotation control device and a door mirror according to an embodiment of the disclosure. Referring to FIG. 1, a door mirror rotation control device 10 is disposed inside a vehicle 1, and a door mirror 120 is disposed on the lateral side of the vehicle 1. The door mirror rotation control device 10 is configured to control rotation of the door mirror 120.

The door mirror rotation control device 10 includes a control part 110. The control part 110 is coupled to the door mirror 120 and is configured to control drive of a motor 121 of the door mirror 120, for example, controlling a rotation direction (forward rotation or reverse rotation), a rotational speed (high speed or low speed), and a rotation action (rotation or stop) of the motor 121. In this embodiment, the control part 110 includes a motor drive controller 111 and a motor action determination part 113.

In an embodiment, the control part 110 may be implemented using physical hardware such as a central processing unit (CPU), a physics processing unit (PPU), a microprocessor, a digital signal processor (DSP), an electronic control unit (ECU), etc. The motor drive controller 111 and the motor action determination part 113 are respectively software modules composed of one or more code segments stored in corresponding storage media of the control part 110. The storage media may be a fixed or movable random access memory (RAM), read-only memory (ROM), cache, hard disk, another similar device, or a combination of the above devices.

In another embodiment, the control part 110 is an embedded system, and the motor drive controller 111 and the motor action determination part 113 may be implemented using physical hardware such as a CPU, a PPU, a microcontroller, a DSP, an ECU, etc. In other embodiments, the motor drive controller 111 may be implemented using physical hardware such as a CPU, a PPU, a microcontroller, a DSP, an ECU, etc., while the motor action determination part 113 may be a software module composed of one or more code segments stored in the corresponding storage media of the control part 110.

In an embodiment, the door mirror 120 is a side mirror installed on both left and right sides of the vehicle 1. The motor 121 is disposed inside the door mirror 120. The motor 121 may be a direct current (DC) motor. However, to be capable of controlling the angle, the motor 121 may be a stepping motor, a servo motor, a brushless motor, etc. In an embodiment, an electric folding unit including the motor 121 is disposed inside the door mirror 120. The electric folding unit is configured to electrically rotate the body of the door mirror 120 with respect to the vehicle body.

The rotation of the motor 121 of the door mirror 120 may be controlled by the control part 110 such that the body of the door mirror 120 is driven by the motor 121 to automatically open and close between an unfolded position (e.g., a position of the door mirror 120 shown by the solid line in FIG. 1) and a folded position (e.g., a position of the door mirror 120 shown by the broken line in FIG. 1). Moreover, the control part 110 is further set to increase the frequency of rotation changes of the motor 121 under predetermined conditions (e.g., when rain is detected). For example, the motor 121 is driven bit by bit to repeatedly execute stop, drive, and forward/reverse rotations.

Specifically, the control part 110 controls drive of the motor 121 by the motor drive controller 111, for example, driving the motor 121 to start or stop running, and controlling drive of the motor 121 (e.g., the rotation direction, the rotational speed, and the rotation action). A drive content (a normal action or a specific action) of the motor 121 is determined by the motor action determination part 113.

When the motor 121 is driven by the motor drive controller 111, the motor action determination part 113 detects raindrop information, and, based on whether raindrop information is acquired, determines whether the drive content of the motor 121 is a normal action or a specific action. The motor drive controller 111 controls drive of the motor 121 in the normal action or the specific action determined by the motor action determination part 113. In addition, by additionally disposing a water drop removal button, a specific operation may be performed at any time according to the driver's operation. The water drop removal button may be a physical push-button, or may be a virtual button displayed on a built-in display in the vehicle 1.

Compared to the normal action, in the specific action, the frequency of speed changes of the motor 121 during a period until drive of the motor 121 ends is higher. That is, the frequency of rotation changes of the motor 121 in the specific action is higher than the frequency of rotation changes of the motor 121 in the normal action. The rotation changes of the motor 121 include the following. The rotational speed repeatedly switches between high speed rotation and low speed rotation (high speed rotation→low speed rotation→high speed rotation→low speed rotation→ ... ). The rotation action repeatedly switches between rotation and stop (rotation→stop rotation stop→ . . . . The rotation direction repeatedly switches between forward rotation and reverse rotation (forward rotation→reverse rotation→forward rotation→reverse rotation→ ... ). The rotation action repeatedly switches between a folded status and an unfolded status of the door mirror (unfolded→folded→unfolded→folded→ ... ).

Figure 2:
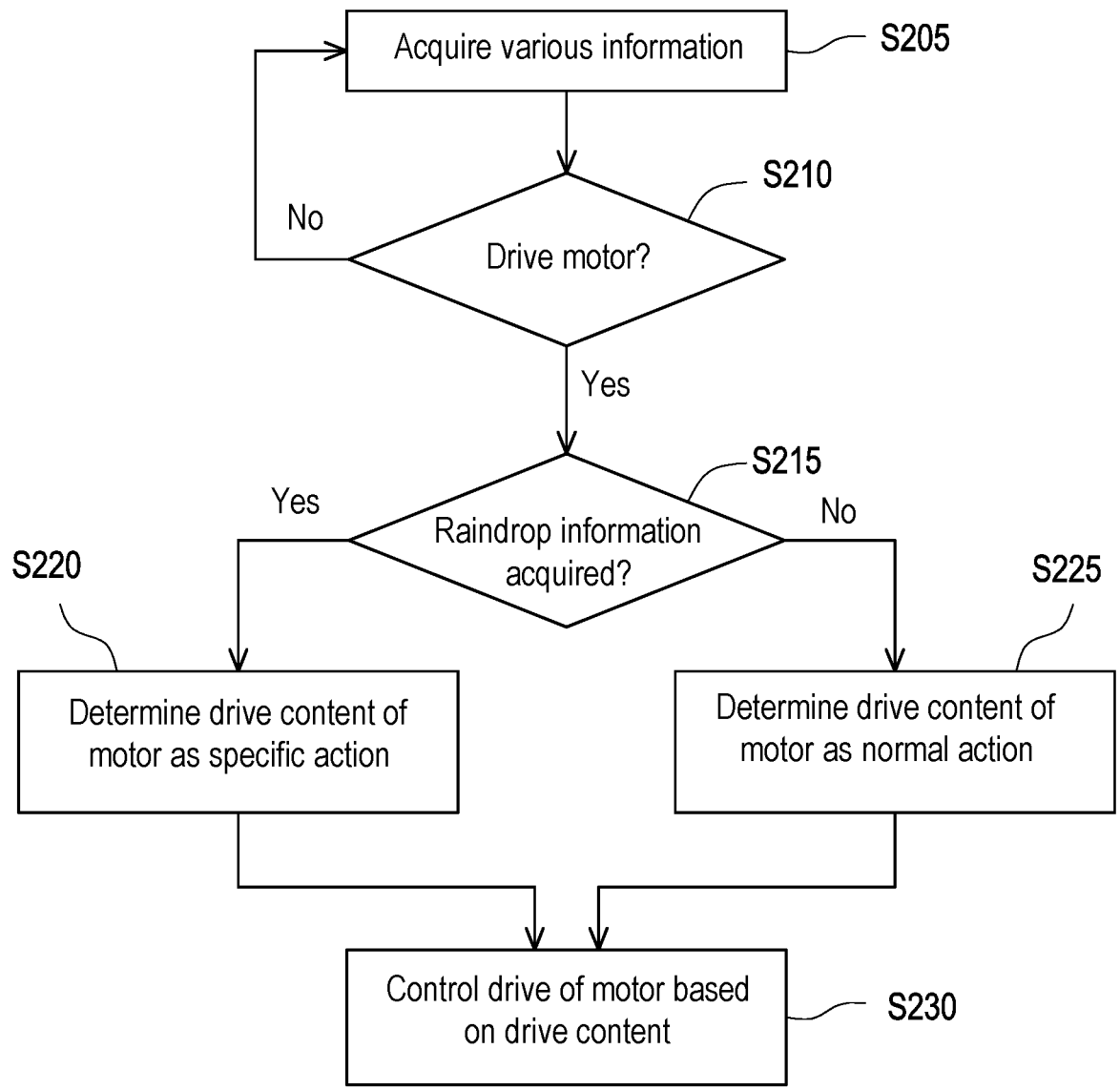
FIG. 2 is a flowchart of a door mirror rotation control method according to an embodiment of the disclosure.

FIG. 2 is a flowchart of a door mirror rotation control method according to an embodiment of the disclosure. Steps S205 to S230 included in FIG. 2 are implemented by the control part 110 and will be detailed below with reference to FIG. 1.

In step S205, various information is acquired. In step S210, it is determined whether to drive the motor 121 based on the acquired information to control rotation of the door mirror 120. For example, the vehicle 1 is mounted with various sensors, detectors, switches, and other components, and the control part 110 determines whether to perform an opening-closing operation of the door mirror 120 according to the information acquired from these components. The opening-closing operation refers to an operation of switching the door mirror 120 between the unfolded status and the folded status.

In the case of determining not to drive the motor 121 (i.e., not to perform the opening-closing operation of the door mirror 120), step S205 is repeatedly executed. In contrast, in the case of determining to drive the motor 121 (i.e., to perform the opening-closing operation of the door mirror 120), step S215 is executed.

In step S215, it is determined by the control part 110 whether raindrop information is acquired. For example, a raindrop sensor may be used to detect whether it is raining. That is, the control part 110 receives raindrop information from the raindrop sensor when it is raining, and does not receive raindrop information from the raindrop sensor when it is not raining. In addition, the raindrop information may also be information indicating whether there are water drops on the door mirror 120. The raindrop information is acquired when water drops are attached to the door mirror 120, and the raindrop information is not acquired when water drops are not attached to the door mirror 120.

In an embodiment, the control part 110 detects raindrop information by the motor action determination part 113 when the motor 121 is driven, and, based on whether raindrop information is acquired, determines whether the drive content of the motor 121 is the normal action or the specific action.

In response to acquiring raindrop information (i.e., it is raining), in step S220, the control part 110 determines, by the motor action determination part 113, that the drive content of the motor 121 is the specific action. In response to not acquiring raindrop information (i.e., it is not raining), in step S225, the control part 110 determines, by the motor action determination part 113, that the drive content of the motor 121 is the normal action.

Subsequently, in step S230, based on the drive content, the motor 121 is controlled by the motor drive controller 111. Accordingly, when rain is detected, the drive content of the motor 121 is changed to remove the raindrops attached to the door mirror 120.

Examples are provided below to illustrate rotation changes of the motor in the normal action and the specific action. The following application examples are used to illustrate multiple possible ways of rotation changes of the motor 121.

Figure 3A:
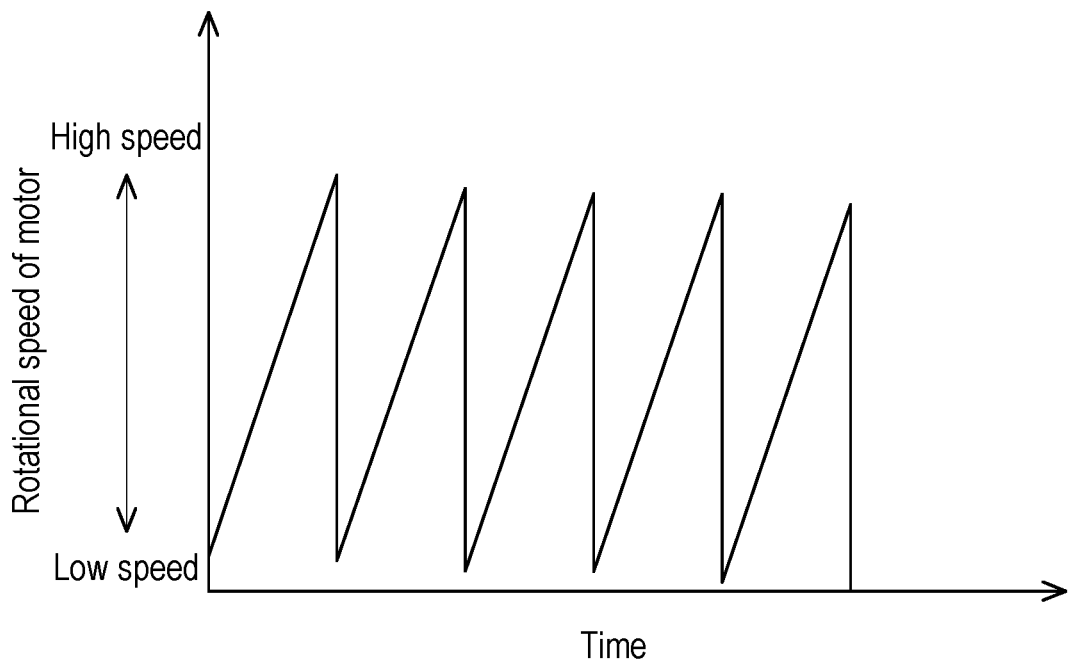
FIG. 3A is a schematic diagram of rotation changes of a motor in a specific action according to a first application example of the disclosure.
Figure 3B:
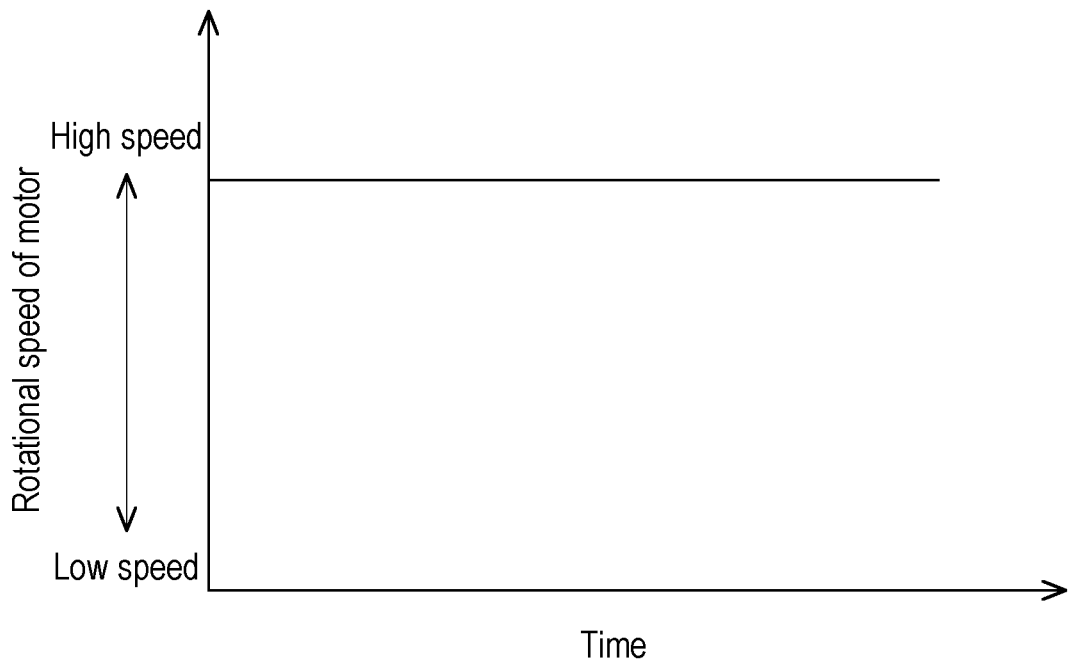
FIG. 3B is a schematic diagram of rotation changes of the motor in a normal action according to the first application example of the disclosure.

FIG. 3A is a schematic diagram of rotation changes of the motor in the specific action according to a first application example of the disclosure. FIG. 3B is a schematic diagram of rotation changes of the motor in the normal action according to the first application example of the disclosure. In the first application example, the drive content of the motor 121 determined by the motor action determination part 113 is related to the rotational speed of the motor 121. The rotation changes of the motor 121 in the specific action are as shown in FIG. 3A, in which the rotational speed repeatedly switches between high speed rotation and low speed rotation. Herein, the speed difference between high speed rotation and low speed rotation may be configured to exceed a specified switch interval.

Accordingly, by repeatedly changing the rotational speed of the motor 121 between high speed and low speed, the driving strength of the door mirror 120 can be changed to cause the raindrops attached to the door mirror 120 to fall off. For example, when rain is detected, the rotational speed of the motor 121 of the door mirror 120 is controlled to repeatedly switch between high speed rotation and low speed rotation to thereby shake off the raindrops by centrifugal force. In addition, since the water drops tend to maintain their movement in the direction of travel due to inertia, the water drops shake off from the door mirror 120. Moreover, the water drops also shake off from the door mirror 120 due to vibration caused by changes in the rotational speed.

In addition, as shown in FIG. 3B, the rotational speed of the motor 121 in the normal action is maintained at a specified speed. For example, the motor 121 is caused to unfold or fold the door mirror 120 at a fixed speed. In the example shown in FIG. 3B, the rotational speed of the motor 121 in the normal action is maintained at a higher speed. In other embodiments, the rotational speed of the motor 121 in the normal action may also be maintained at a lower speed.

Figure 4A:
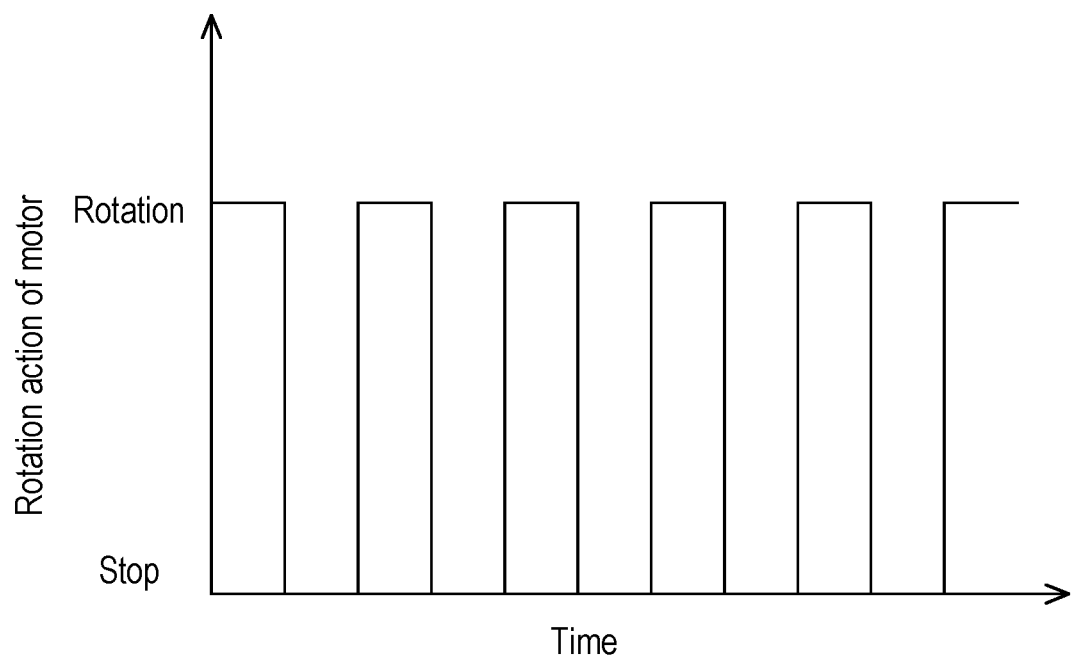
FIG. 4A is a schematic diagram of rotation changes of the motor in the specific action according to a second application example of the disclosure.
Figure 4B:
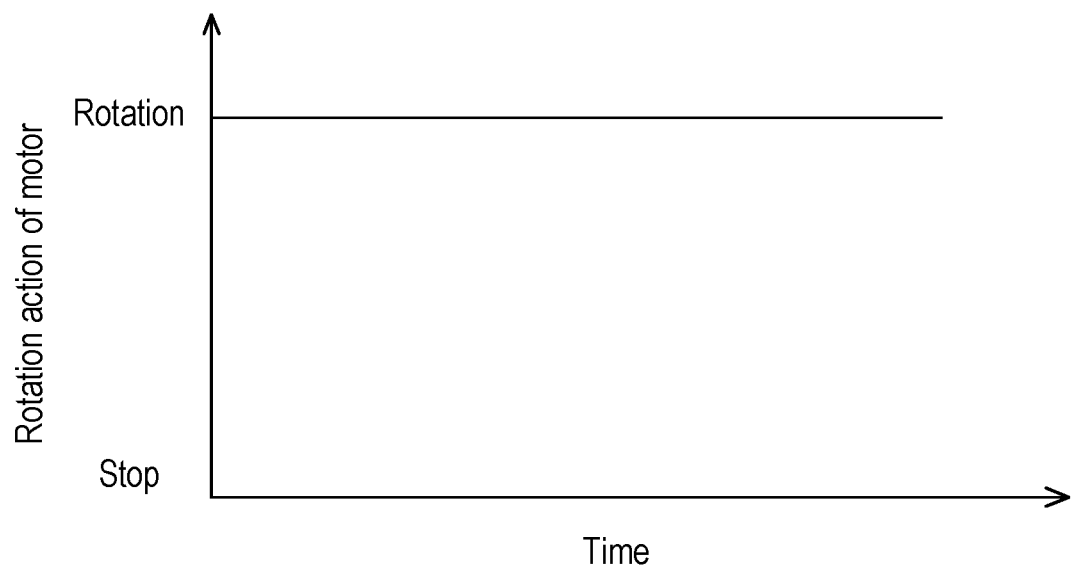
FIG. 4B is a schematic diagram of rotation changes of the motor in the normal action according to the second application example of the disclosure.

FIG. 4A is a schematic diagram of rotation changes of the motor in the specific action according to a second application example of the disclosure. FIG. 4B is a schematic diagram of rotation changes of the motor in the normal action according to the second application example of the disclosure. In the second application example, the drive content of the motor 121 determined by the motor action determination part 113 is related to the rotation action of the motor 121. The rotation changes of the motor 121 in the specific action are as shown in FIG. 4A, in which the rotation action repeatedly switches between rotation and stop.

Accordingly, by repeatedly changing the motor 121 between rotation and stop, the driving strength of the door mirror 120 can be changed to cause the raindrops attached to the door mirror 120 to fall off. For example, since the water drops tend to maintain their movement in the direction of travel due to inertia, the water drops shake off from the door mirror 120. Moreover, the water drops also shake off from the door mirror 120 due to vibration caused by changes in the rotation action.

In addition, as shown in FIG. 4B, the rotation action of the motor 121 in the normal action is maintained at the status of rotation.

Figure 5A:
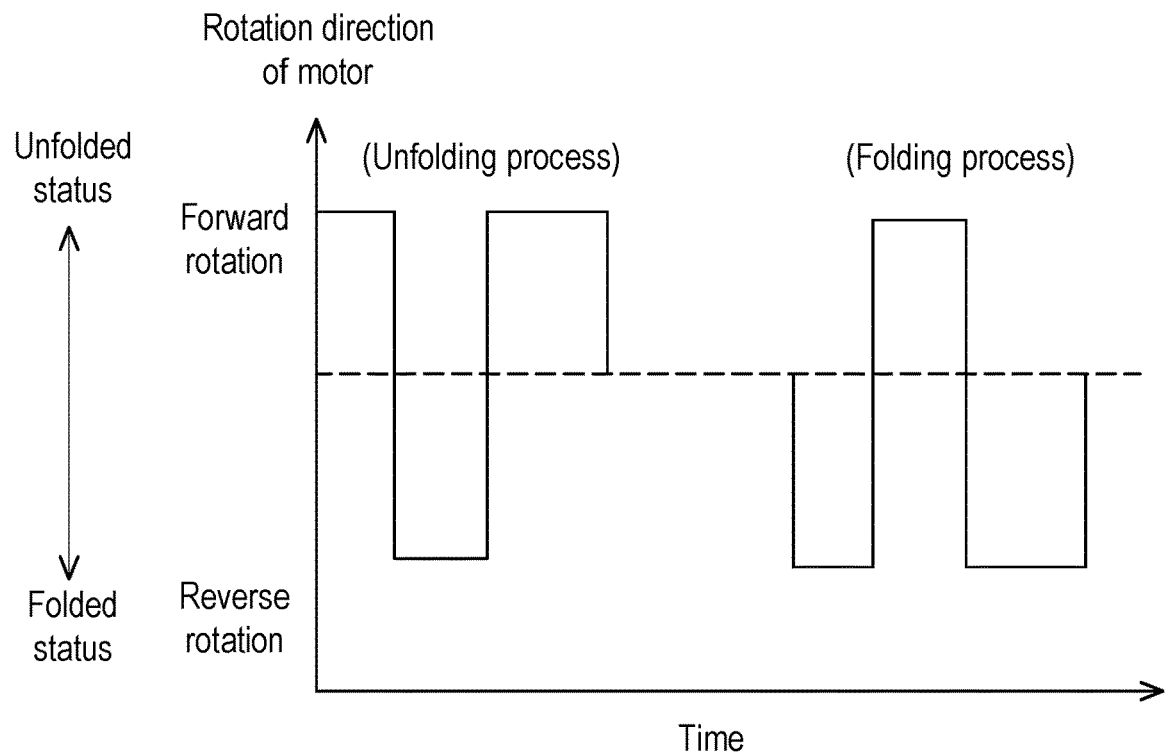
FIG. 5A is a schematic diagram of rotation changes of the motor in the specific action according to a third application example of the disclosure.
Figure 5B:
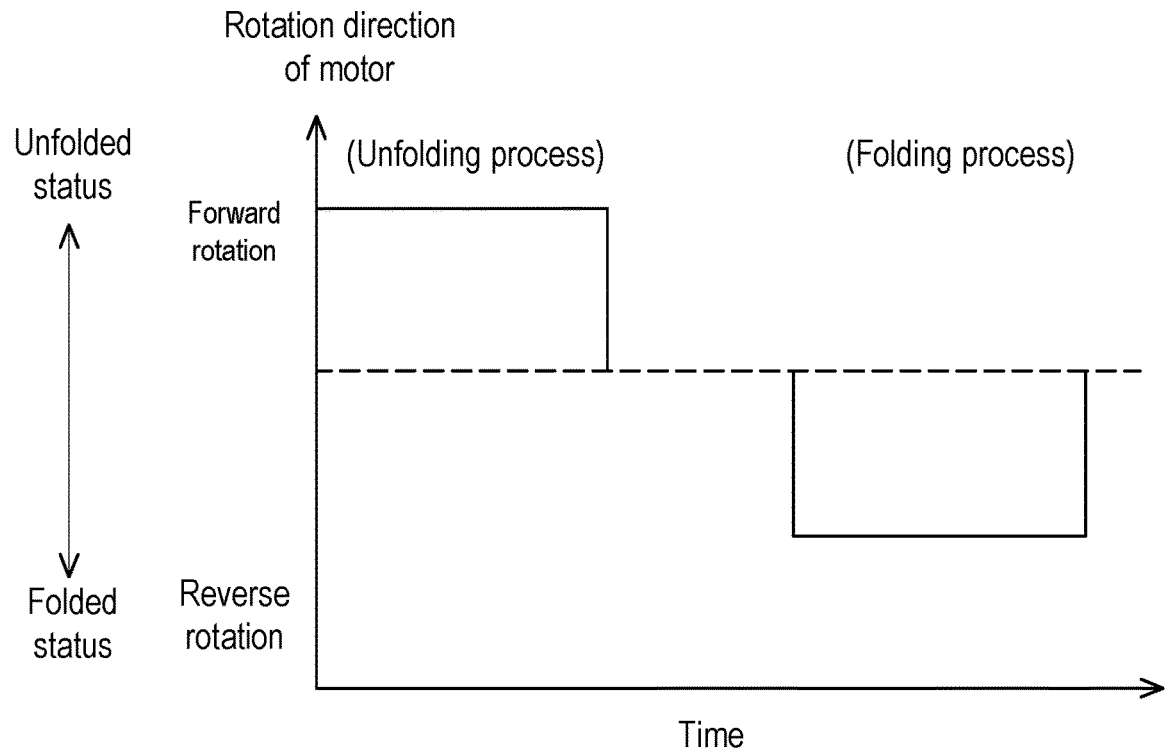
FIG. 5B is a schematic diagram of rotation changes of the motor in the normal action according to the third application example of the disclosure.

FIG. 5A is a schematic diagram of rotation changes of the motor in the specific action according to a third application example of the disclosure. FIG. 5B is a schematic diagram of rotation changes of the motor in the normal action according to the third application example of the disclosure. In the third application example, the drive content of the motor 121 determined by the motor action determination part 113 is related to the rotation direction of the motor 121. In the third application example shown in FIG. 5A and FIG. 5B, the motor 121 unfolds the door mirror 120 by forward rotation and folds the door mirror 120 by reverse rotation. The rotation changes of the motor 121 of the unfolding process and of the folding process shown in FIG. 5A and FIG. 5B are not in a temporal relationship and are drawn in the same figure only for convenience of illustration.

In the third application example, the rotation changes of the motor 121 in the specific action include repeatedly switching the rotation direction between forward rotation and reverse rotation. Referring to FIG. 5A, the specific action during the unfolding process includes: unfolding in forward rotation, in the middle of the unfolding process, switching the rotation direction of the motor 121 to reverse rotation for a period of time, and then switching the rotation direction to forward rotation to continue unfolding the door mirror 120. In the folding process, the specific action includes: folding in reverse rotation, in the middle of the folding process, switching the rotation direction of the motor 121 to forward rotation for a period of time, and then switching the rotation direction to reverse rotation to continue folding the door mirror 120. Accordingly, during the unfolding or folding process, the door mirror vibrates due to the sudden switch of the rotation direction to thereby cause the raindrops attached to the door mirror 120 to fall off. Inertia also causes the raindrops to continue moving in the direction of travel and causes the raindrops to shake off from the door mirror 120.

Referring to FIG. 5B, the normal action during the unfolding process is: the motor 121 unfolds the door mirror 120 to the unfolded status in forward rotation. The normal action during the folding process is: the motor 120 folds the door mirror 120 to the folded status in reverse rotation.

Figure 6A:
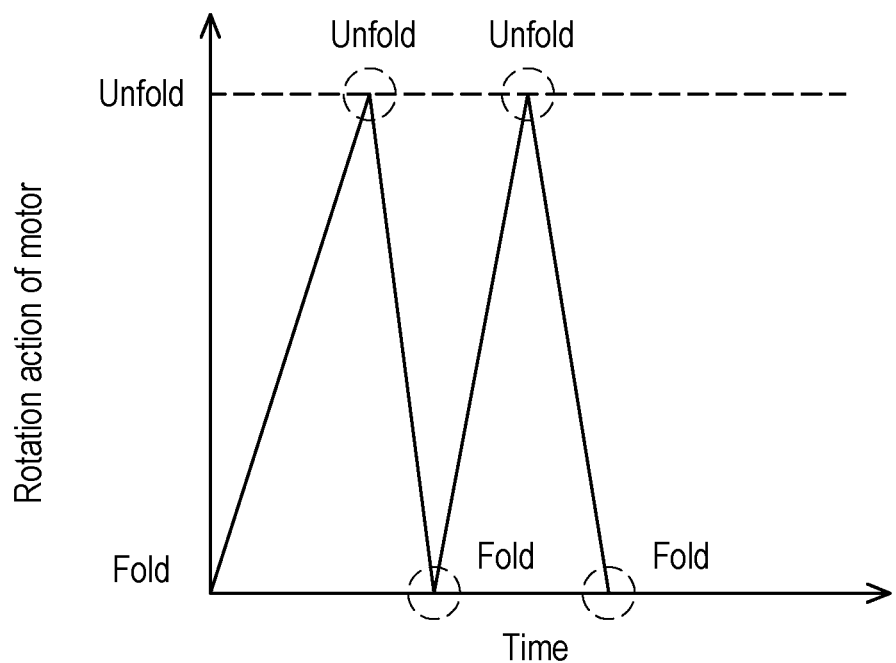
FIG. 6A is a schematic diagram of rotation changes of the motor in the specific action according to a fourth application example of the disclosure.
Figure 6B:
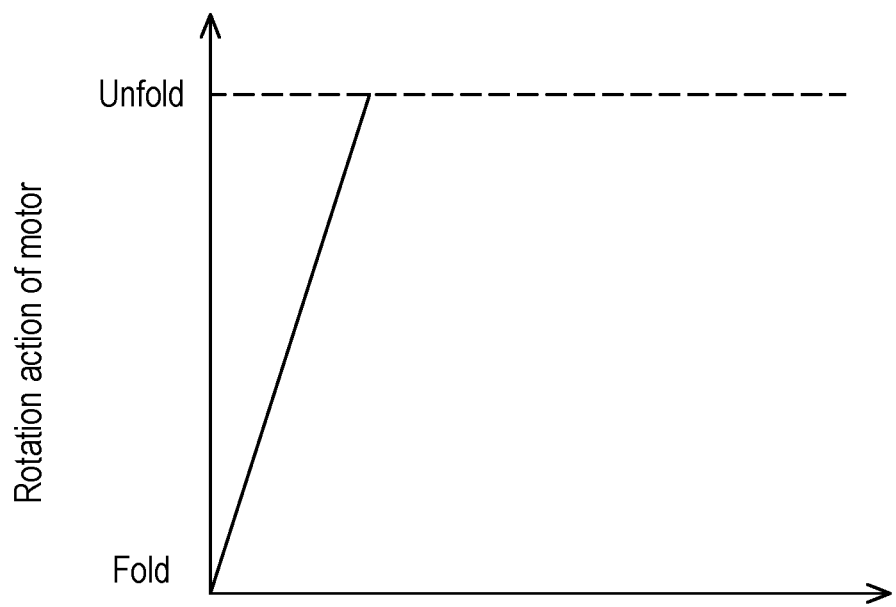
FIG. 6B is a schematic diagram of rotation changes of the motor in the normal action according to the fourth application example of the disclosure.

FIG. 6A is a schematic diagram of rotation changes of the motor in the specific action according to a fourth application example of the disclosure. FIG. 6B is a schematic diagram of rotation changes of the motor in the normal action according to the fourth application example of the disclosure. In the fourth application example, the drive content of the motor 121 determined by the motor action determination part 113 is related to the rotation action of the motor 121. The rotation changes of the motor 121 in the specific action are as shown in FIG. 6A, in which the rotation action repeatedly switches between a folding action and an unfolding action of the door mirror 120, that is: unfolding the door mirror 120→folding the door mirror 120→unfolding the door mirror 120→folding the door mirror 120→unfolding the door mirror 120 . . . .

In addition, as shown in FIG. 6B, the rotation action of the motor 121 in the normal action is: after switching the door mirror 120 from the folded status to the unfolded status, maintaining the unfolded status.

Figure 7A:
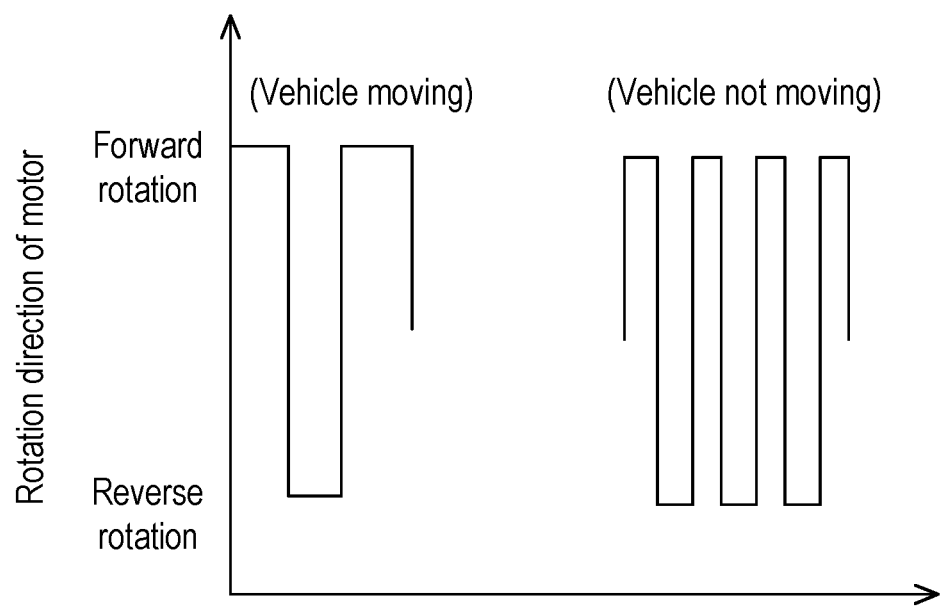
FIG. 7A is a schematic diagram of rotation changes of the motor according to a fifth application example of the disclosure.
Figure 7B:
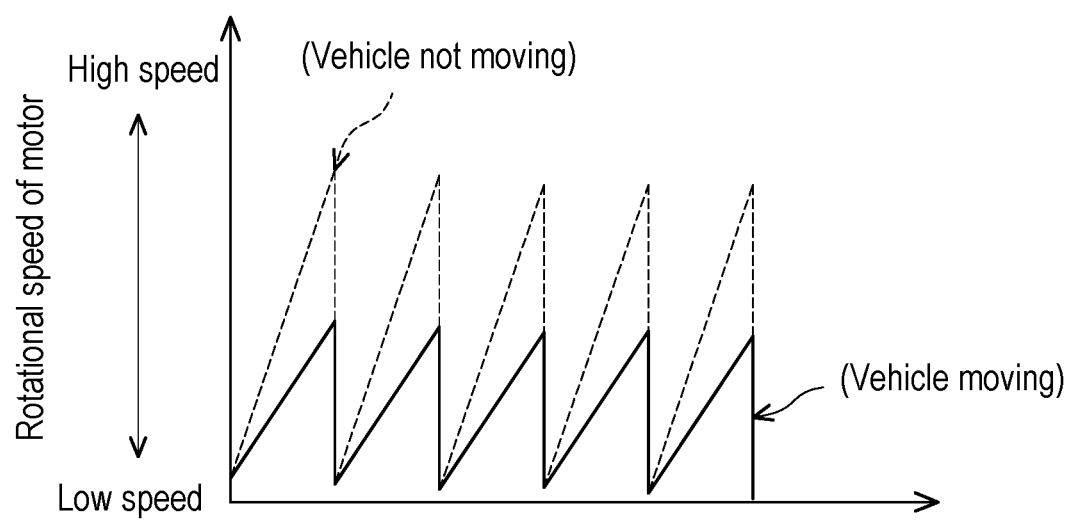
FIG. 7B is a schematic diagram of rotation changes of the motor according to a sixth application example of the disclosure.

FIG. 7A is a schematic diagram of rotation changes of the motor according to a fifth application example of the disclosure. FIG. 7B is a schematic diagram of rotation changes of the motor according to a sixth application example of the disclosure. In the fifth application example and the sixth application example, the specific action is determined based on whether the vehicle 1 will drive within a predetermined time. Compared to the case where the vehicle 1 drives within a predetermined time, in the case where the vehicle 1 will not drive within the predetermined time, the frequency of rotation changes of the motor 121 is high, or the amount of rotation changes of the motor 121 is large.

FIG. 7A and FIG. 7B show a case where the vehicle 1 will drive (vehicle moving) within a predetermined time and a case where the vehicle 1 will not drive (vehicle not moving) within the predetermined time. These two cases are not in a temporal relationship and are drawn in the same figure only for convenience of illustration.

FIG. 7A is an example illustrating the frequency of rotation changes by repeatedly switching the rotation direction of the motor 121 between forward rotation and reverse rotation. As shown in FIG. 7A, the frequency of rotation changes in the case where the vehicle 1 does not move is higher than the frequency of rotation changes in the case where the vehicle 1 moves. FIG. 7B is an example illustrating the amount of rotation changes by repeatedly switching the rotational speed of the motor 121 between high speed rotation and low speed rotation. As shown in FIG. 7B, the amount of rotation changes in the case where the vehicle 1 does not move is larger than the amount of rotation changes in the case where the vehicle 1 moves.

When the vehicle 1 does not drive within the predetermined time and the door mirror 120 is unfolded, since the water drops are not removed during a vehicle driving process, the frequency of rotation changes and the amount of rotation changes are increased to enhance the effect of water drop removal.

Figure 8:
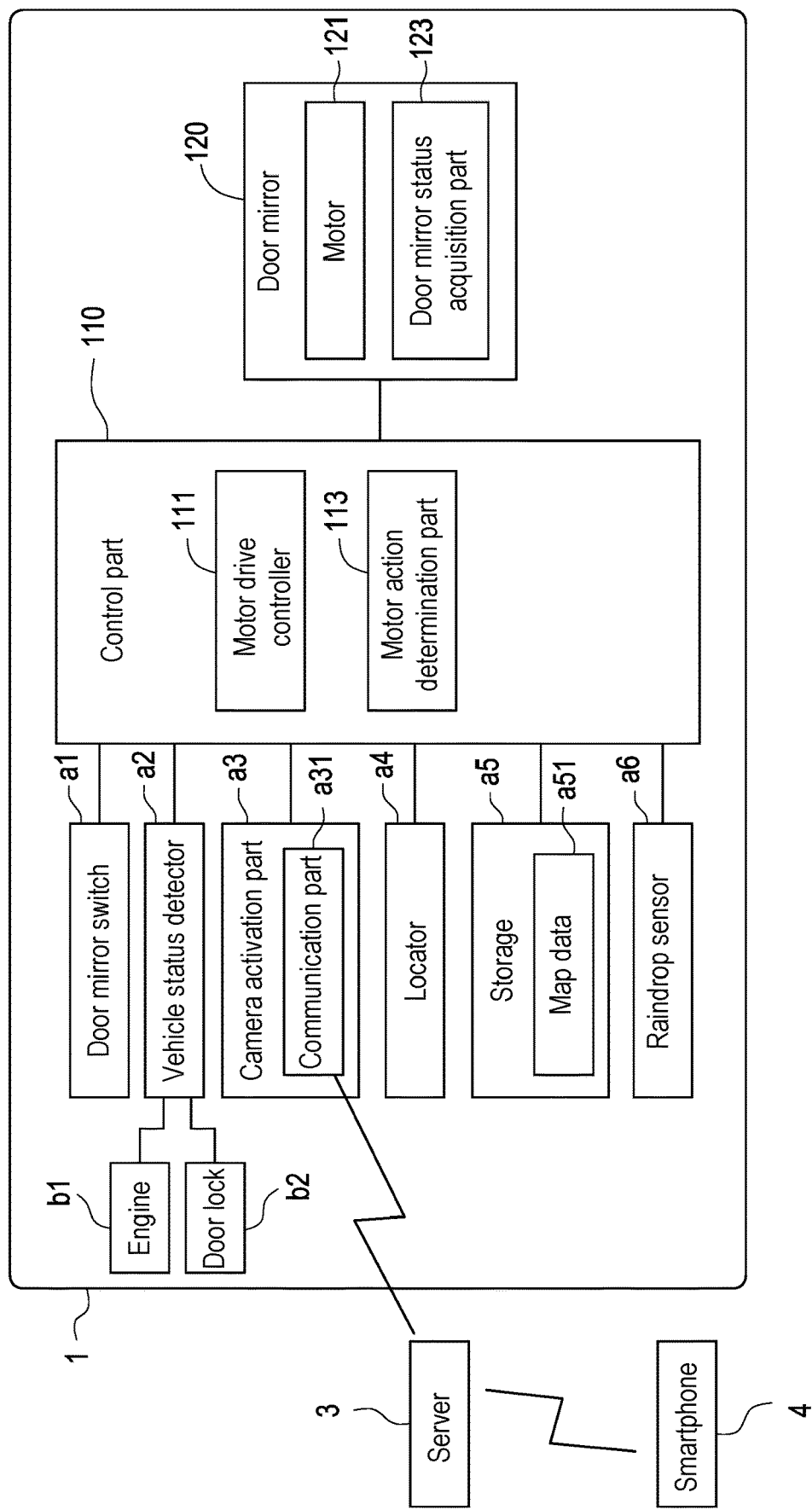
FIG. 8 is a block diagram of an internal structure of the vehicle according to an embodiment of the disclosure.

FIG. 8 is a block diagram of an internal structure of the vehicle according to an embodiment of the disclosure. Referring to FIG. 8, the vehicle 1 includes components such as a control part 110, a door mirror 120, a door mirror switch a1, a vehicle status detector a2, a camera activation part a3 with a communication part a31, a locator a4, a storage a5 storing map data a51, a raindrop sensor a6, an engine b1, and a door lock b2. The internal structure shown in FIG. 8 is only one of the embodiments and the disclosure is not limited thereto. In the vehicle 1 shown in FIG. 8, reference may be made to the descriptions of FIG. 1 for relevant descriptions of the control part 110 and the door mirror 120, which will not be repeated herein. In this embodiment, the door mirror 120 further includes a door mirror status acquisition part 123, which is configured to learn whether the body of the door mirror 120 is currently in an unfolded status or a folded status. The door mirror switch a1 is, for example, a physical switch disposed close to the driver's seat for a user to manually drive the opening-closing operation of the door mirror 120. The control part 110 controls unfolding or folding of the door mirror 120 based on the enabling or disabling of the door mirror switch a1. For example, the control part 110 drives the door mirror 120 to unfold when receiving enabling information from the door mirror switch a1, and drives the door mirror 120 to fold when receiving disabling information.

The vehicle status detector a2 is configured to detect start statuses of the engine b1 and the door lock b2. For example, the control part 110 drives the door mirror 120 to unfold when receiving information from the vehicle status detector a2 indicating startup of the engine b1, and drives the door mirror 120 to fold when receiving information indicating shutdown of the engine. For example, the control part 110 drives the door mirror 120 to unfold when receiving information from the vehicle status detector a2 indicating unlocking of the door lock b2, and drives the door mirror 120 to fold when receiving information indicating locking of the door lock b2.

The camera activation part a3 includes a communication part a31 and receive a remote control command via the communication part a31 to activate the camera based on the received command. In an embodiment, the manufacturer or dealer of the vehicle 1 may set up a server 3 and provide remote control services for users (authorized drivers or passengers) to use. The users install a corresponding application (APP) in their smartphones 4 and perform remote control via a user interface provided by the APP. For example, a camera activation command is issued via the user interface, and the camera activation command is sent to the camera activation part a3 via the server.

In some embodiments, the user further sets up cameras in, for example, the front, rear, left, and right directions of the vehicle 1 to record the surrounding images in real time while traveling. The cameras set up in the front and rear directions of the vehicle 1 are placed at positions where raindrops do not fall easily even when the vehicle 1 is parked, but the cameras set up on the lateral side tend to be affected by raindrops in rainy situations.

Figure 9:
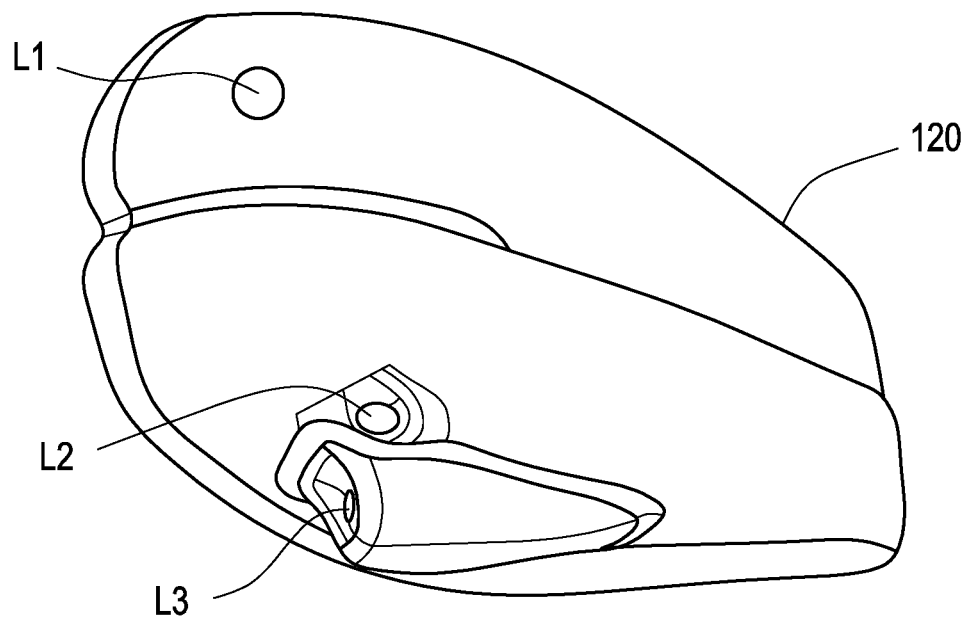
FIG. 9 is a schematic view of a mirror case of the door mirror according to an embodiment of the disclosure.

To prevent water drops from affecting the line of sight of shooting of the camera in rainy situations, in an embodiment, the camera may be disposed at any position on the mirror case of the door mirror 120, and the water drops attached to the camera may shake off by the switch between the unfolded status and the folded status of the door mirror 120. FIG. 9 is a schematic view of the mirror case of the door mirror according to an embodiment of the disclosure. Referring to FIG. 9, the camera may be disposed at any of positions L1, L2, and L3 on the mirror case, or two or three cameras may be disposed at two or three of the positions, and the disclosure is not limited herein. In remote vehicle monitoring, the camera is activated to capture images by remote control. Even in rainy situations, the raindrops attached to the camera can be dropped off to thereby more clearly check on the surrounding of the vehicle 1.

In an embodiment, the activation of the shooting function of the camera may be set as a trigger scenario for automatically driving the door mirror 120. For example, when the control part 110 activates the shooting function of the camera, the control part 110 also further drives the opening-closing action of the door mirror 120.

The locator a4 is configured to acquire the current location of the vehicle 1. For example, the global positioning system (GPS) may be used to implement the locator a4. The storage a5 may be a RAM, a ROM, a hard disk, another similar device, or a combination of the above devices, and is configured to store the map data a51. For example, the control part 110 may refer to the current location acquired by the locator a4 and the map data a51 at the same time to determine whether the vehicle 1 is close to a destination or home, and then determine the frequency of rotation changes of the motor 121 of the door mirror 120. For example, by using the locator a4 and the map data a51, when it is determined that the vehicle 1 is close to a predetermined location (e.g., a house) and the windshield wiper is driven (or raindrop information is detected by the raindrop sensor a6), the frequency of rotation changes of the control motor 121 is controlled to increase. In addition, conditions such as when the vehicle is in automatic driving or when the vehicle stops may also be further added as conditions for controlling the increase in the frequency of rotation changes of the motor 121.

The raindrop sensor a6 is configured to detect whether it is raining and the intensity of the rainfall. The raindrop sensor a6 is, for example, of a photoelectric type or a piezoelectric type. The photoelectric raindrop sensor a6 performs detection based on changes in light. The piezoelectric raindrop sensor a6 performs detection based on changes in the voltage waveform converted from energy of raindrop impact.

In addition, the control part 110 may further determine a power status of the vehicle 1, and then automatically drive the opening-closing operation of the door mirror 120 based on the power status. Generally, the power status of the vehicle 1 includes: a LOCK/OFF status, an accessory (ACC) status, an ON status, and a START status. The timing of automatically driving the door mirror 120 may be set to when the power status is in the ON status (hereinafter referred to as an IGN-ON status) or the OFF status (hereinafter referred to as an IGN-OFF status). Alternatively, the timing of automatically driving the door mirror 120 may also be set to when preparing to park. Alternatively, the timing of automatically driving the door mirror 120 may also be set to: when the door lock b2 is unlocked; when the shooting function of the camera is activated; and when shifting gear (switching from D gear to R gear).

Figure 10:
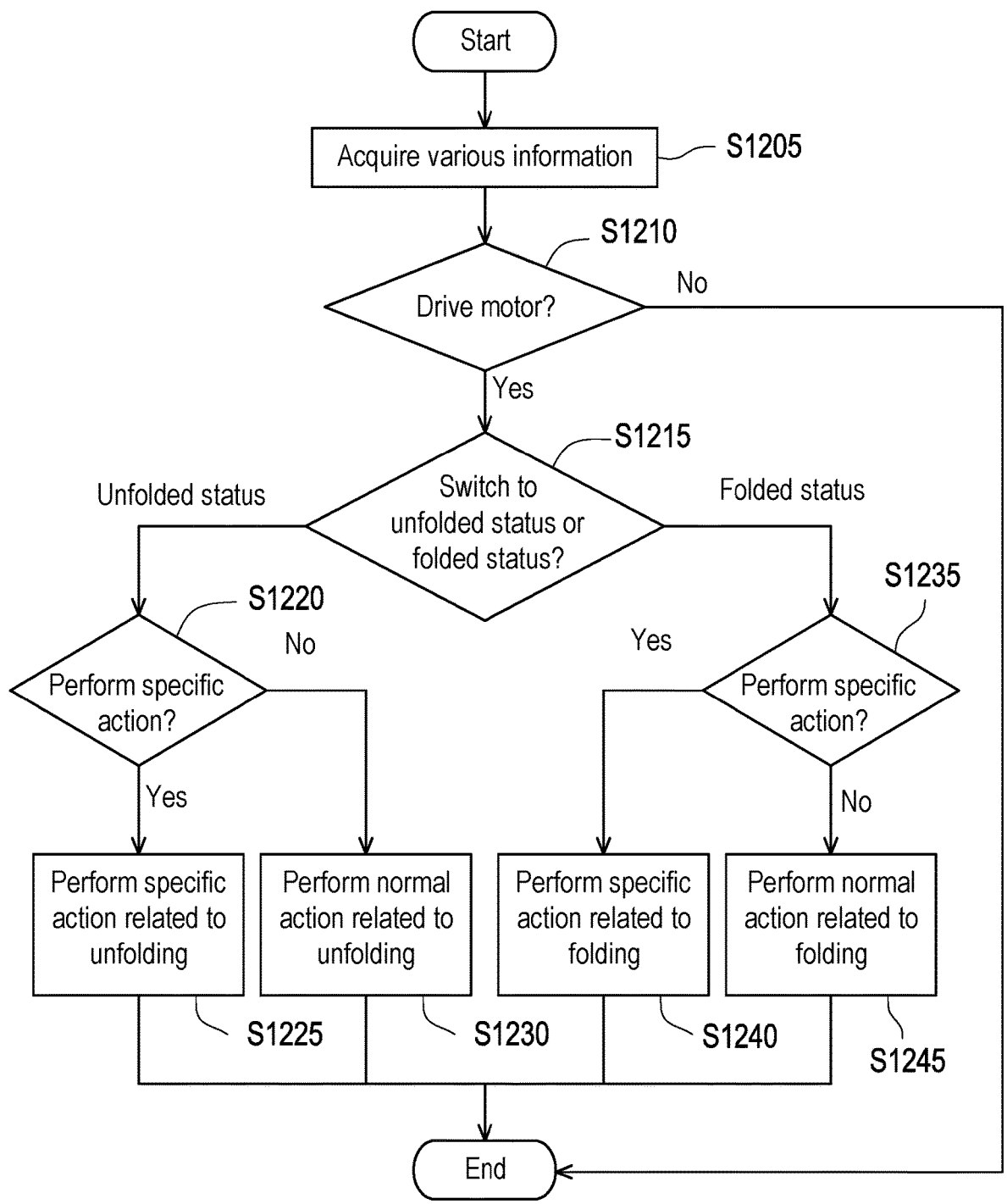
FIG. 10 is a flowchart of the door mirror rotation control method according to an embodiment of the disclosure.

FIG. 10 is a flowchart of a door mirror rotation control method according to an embodiment of the disclosure. In this embodiment, each step is executed by the control part 110. Referring to FIG. 10, in step S1205, the control part 110 acquires various information, such as various information acquired from the door mirror switch a1, the vehicle status detector a2, the camera activation part a3, and the locator a4.

In step S1210, based on the various information acquired, it is determined whether to drive the motor 121 of the door mirror 120. In response to determining to drive the motor 121 (S1210: Yes), in step S1215, it is determined whether to switch to the unfolded status. If it is not detected to drive the motor 121 (S1210: No), then this process is stopped.

For example, the user decides to unfold or fold the door mirror 120 by pressing the door mirror switch a1. Alternatively, the user sends a camera activation command to the camera activation part a3 via the smartphone 4 to unfold or fold the door mirror 120. Alternatively, it is determined to unfold or fold the door mirror 120 based on the information detected by the vehicle status detector a2.

When it is determined to switch to the unfolded status, in step S1220, it is determined whether to perform the specific action. If it is determined to switch to the unfolded status and it is determined to perform the specific action (S1220: Yes), in step S1225, the specific action related to unfolding is performed. The specific action includes the following. For example, during the process of controlling the door mirror 120 to gradually rotate from the folded position to the unfolded position (unfolding process), the rotation changes of the motor 121 are controlled in the following manners, including: (1) repeatedly switching the rotational speed of the motor 121 by "high speed rotation→low speed rotation→high speed rotation→low speed rotation→ . . . "; (2) repeatedly switching the rotation action of the motor 121 by "rotation→stop→rotation→stop→ . . . "; and (3) repeatedly switching the rotation action of the motor 121 by "forward rotation→reverse rotation→forward rotation→reverse rotation . . . ".

If it is determined to switch to the unfolded status and it is determined not to perform the specific action (S1220: No), in step S1230, the normal action related to unfolding is performed. The normal action includes the following. For example, during the process of controlling the door mirror 120 to gradually rotate from the folded position to the unfolded position (unfolding process), the motor 121 is controlled to rotate at a fixed speed.

If it is determined to switch to the folded status, in step S1235, it is determined whether to perform the specific action. If it is determined to switch to the folded status and it is determined to perform the specific action (S1235: Yes), in step S1240, the specific action related to folding is performed. The specific action includes the following. For example, during the process of controlling the door mirror 120 to gradually rotate from the unfolded position to the folded position (folding process), the rotation changes of the motor 121 are controlled in the following manners, including: (1) repeatedly switching the rotational speed of the motor 121 by "high speed rotation→low speed rotation→high speed rotation→low speed rotation→ . . . "; (2) repeatedly switching the rotation action of the motor 121 by "rotation→stop→rotation→stop→ . . . "; and (3) repeatedly switching the rotation action of the motor 121 by "forward rotation→reverse rotation→forward rotation→reverse rotation→ . . . ".

If it is determined to switch to the folded status and it is determined not to perform the specific action (S1235: No), in step S1245, the normal action related to folding is performed. The normal action includes the following. For example, during the process of controlling the door mirror 120 to gradually rotate from the unfolded position to the folded position (folding process), the motor 121 is controlled to rotate at a fixed speed.

In steps S1220 and S1235, it may be determined whether to perform the specific action based on whether the raindrop sensor a6 detects raindrop information.

Figure 11:
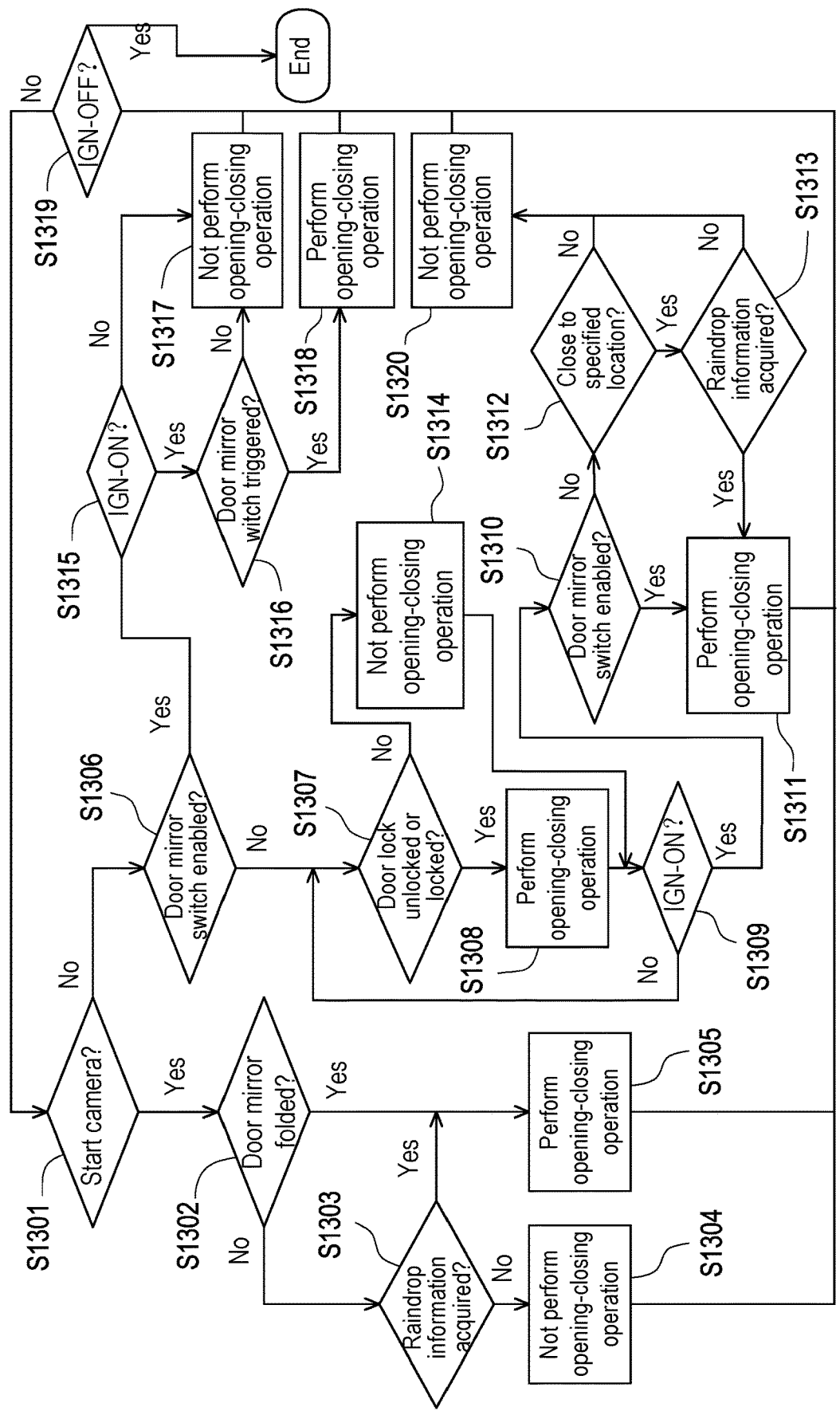
FIG. 11 is a flowchart of the door mirror rotation control method according to another embodiment of the disclosure.

FIG. 11 is a flowchart of the door mirror rotation control method according to another embodiment of the disclosure. In this embodiment, each step is executed by the control part 110. Referring to FIG. 11, in step S1301, it is determined whether to start the camera. For example, the control part 110 determines whether to start the camera based on whether the camera activation part a3 has received a camera activation command. The start of the camera is a trigger scenario for automatically driving the door mirror 120.

If it is determined to start the camera (S1301: Yes), in step S1302, it is determined whether the door mirror 120 is currently in the folded status. If the door mirror 120 is not in the folded status but in the unfolded status (S1302: No), in step S1303, it is determined whether raindrop information is acquired. If raindrop information has not been acquired (S1303: No), in step S1304, the door mirror 120 is not driven to perform the opening-closing operation. Then, step S1319 is executed. In step S1319, it is determined whether the power status is in the IGN-OFF status. If it is not in the IGN-OFF status, the process returns to step S1301. If it is in the IGN-OFF status, this process is ended.

If raindrop information is acquired (S1303: Yes), in step S1305, the door mirror 120 is driven to perform the opening-closing operation, for example, switching the door mirror 120 to the unfolded status. If the door mirror 120 is currently in the folded status (S1302: Yes), in step S1305, the door mirror 120 is driven to perform the opening-closing operation, for example, switching the door mirror 120 to the unfolded status. Then, step S1319 is executed.

Returning to step S1301, if it is determined that the camera is not started (S1301: No), in step S1306, it is determined whether the door mirror switch a1 is enabled. In the case where the door mirror switch a1 is not enabled (S1306: No), in step S1307, it is determined whether the door lock b2 is unlocked or locked. Herein, the unlocking/locking of the door lock b2 is a trigger scenario for automatically driving the door mirror 120. Accordingly, in the case of determining that the door lock b2 is unlocked or locked, in step S1308, the door mirror 120 is driven to perform the opening-closing operation, for example, switching the door mirror 120 to the unfolded status or the folded status.

Then, in step S1309, it is determined whether the power status is in the IGN-ON status. If it is determined that it is not in the IGN-ON status (S1309: No), the process returns to step S1307. If it is determined that it is in the IGN-ON status (S1309: Yes), in step S1310, it is determined whether the door mirror switch a1 is enabled. If it is determined that the door mirror switch a1 is enabled (S1310: Yes), in step S1311, the door mirror 120 is driven to perform the opening-closing operation, for example, switching the door mirror 120 to the unfolded status or the folded status. Then, step S1319 is executed.

If it is determined that the door mirror switch a1 is not enabled (S1310: No), in step S1312, it is determined whether the current location of the vehicle 1 is close to a specified location. If it is determined that the current location of the vehicle 1 is close to the specified location based on comparison of the information detected by the locator a4 and the map data a51 (S1312: Yes), in step S1313, it is determined whether raindrop information is acquired. In the case where raindrop information is acquired (S1313: Yes), step S1311 is executed. In the case where raindrop information has not been acquired (S1313: No), step S1320 is executed, and the door mirror 120 is not driven to perform the opening-closing operation. Then, step S1319 is executed. In addition, if it is determined in step S1312 that the current location of the vehicle 1 is not yet close to the specified location (S1312: No), step S1320 is executed.

Returning to step S1307, in the case where it is determined that the door lock b2 is not unlocked/locked, step S1314 is executed, and the door mirror 120 is not driven to perform the opening-closing operation. Then, step S1309 is executed.

Returning to step S1306, in the case where the door mirror switch a1 is enabled (S1306: Yes), in step S1315, it is determined whether the power status is in the IGN-ON status. If it is determined that it is not in the IGN-ON status (S1315: No), in step S1317, the door mirror 120 is not driven to perform the opening-closing operation. Then, step S1319 is executed. If it is determined that it is in the IGN-ON status (S1315: Yes), in step S1316, it is determined whether the door mirror switch a1 is enabled. If it is determined that the door mirror switch a1 is enabled (S1316: Yes), in step S1318, the door mirror 120 is driven to perform the opening-closing operation, for example, switching the door mirror 120 to the unfolded status or the folded status. Then, step S1319 is executed. If it is determined that the door mirror switch a1 is not enabled (S1316: No), in step S1317, the door mirror 120 is not driven to perform the opening-closing operation. Then, step S1319 is executed.

Figure 12:
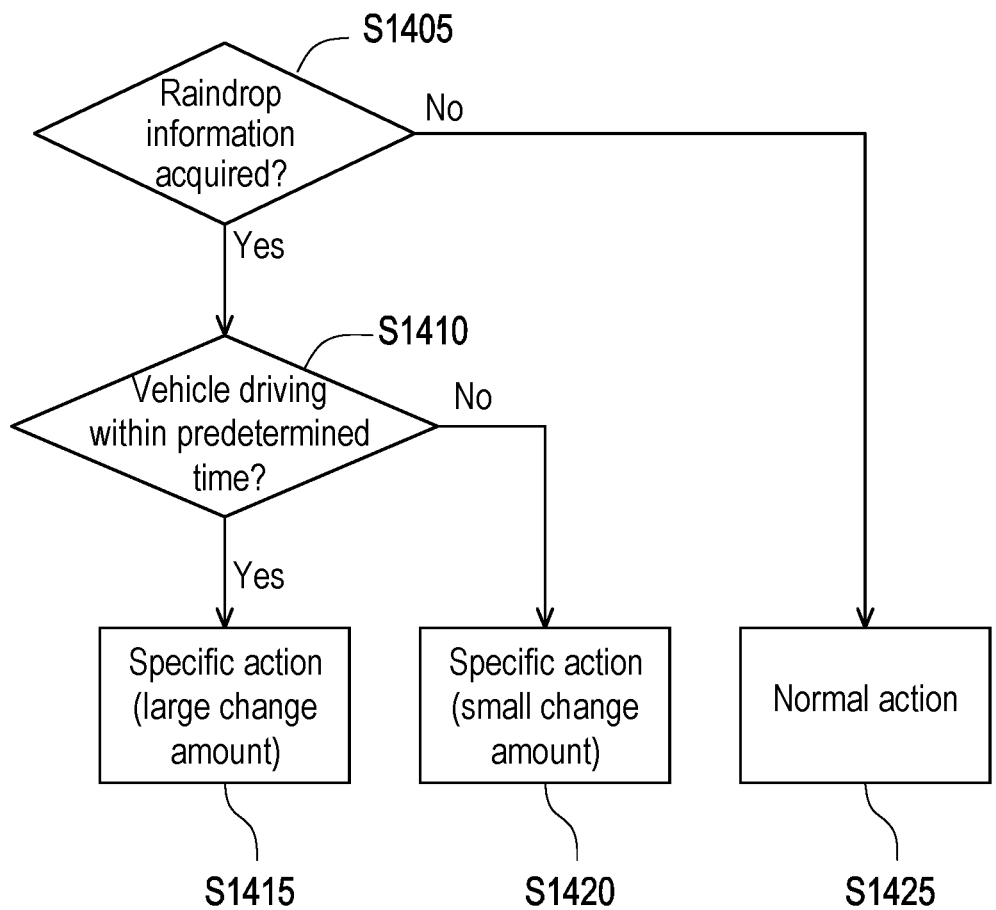
FIG. 12 is a flowchart of the door mirror rotation control method according to another embodiment of the disclosure.

FIG. 12 is a flowchart of the door mirror rotation control method according to another embodiment of the disclosure. In this embodiment, each step is executed by the control part 110. Referring to FIG. 12, in step S1405, it is determined whether raindrop information is acquired. When the motor 121 is driven by the motor drive controller 111, the motor action determination part 113 detects raindrop information, and based on whether raindrop information has been acquired, the drive content of the motor 121 is determined as the normal action or the specific action.

In response to not acquiring raindrop information (i.e., it is not raining), in step S1425, the control part 110 determines the drive content of the motor 121 as the normal action by the motor action determination part 113. In response to acquiring raindrop information (i.e., it is raining), in step S1410, the control part 110 estimates whether the vehicle 1 will drive within a predetermined time.

If it is determined that the vehicle 1 will drive within the predetermined time, in step S1415, the specific action with a large amount of rotation change is performed (e.g., the example shown by the broken line in FIG. 7B). If it is determined that the vehicle 1 does not drive within the predetermined time, in step S1420, the specific action with a small amount of rotation change is performed (e.g., the example shown by the solid line in FIG. 7B). That is, compared to the case of driving within the predetermined time, in the case where it is determined that the vehicle is does not drive within the predetermined time, the amount of rotation change of the motor 121 is large.

For example, the user may observe the status of the vehicle 1 via the user interface provided by the APP installed on the smartphone 4. In the case where the vehicle 1 does not drive within the predetermined time (vehicle not moving), the user interface of the smartphone 4 will display a related screen indicating end of drive of the motor 121. In addition, in the case where the vehicle 1 drives within the predetermined time (vehicle moving), the door lock b2 is in the unlocked status, and the power status is in the IGN-ON status.

In an embodiment, the smartphone 4 may be further connected with the vehicle 1 via the remote monitoring function, and then a command may be issued via the smartphone 4 to control the opening and closing of the door mirror 120. In addition, the user may view the images recorded by the camera disposed on the vehicle 1 via the smartphone 4.

When the vehicle 1 does not drive within the predetermined time and the door mirror 120 is in the unfolded status, since the water drops attached to the door mirror 120 during vehicle driving of the vehicle 1 are not removed, the amount of rotation change is increased to enhance the effect of water drop removal.

In addition, the control part 110 may further acquire a stop duration of the vehicle 1. In the case where it is determined that the stop duration is greater than or equal to a preset duration and raindrop information has been acquired, drive of the motor 121 is determined to perform the specific action. Since raindrops easily attach to the door mirror 120 when the vehicle 1 stops, after the vehicle 1 has stopped for a long time, the motor 121 may be driven to remove the raindrops attached to the door mirror 120 by performing the specific operation.

In addition, the driver may set in advance a warning message about the opening and closing of the door mirror 120 to be inserted into an image displayed on a built-in display in the vehicle 1 during drive of the motor 121 when the vehicle 1 is driving.

Based on the above, the disclosure controls rotation of the motor of the door mirror by the control part. Under predetermined conditions (e.g., when raindrop information is detected), the drive content of the motor of the door mirror is changed to alter the rotation changes of the motor to thereby shake off (remove) the raindrops attached to the door mirror. Accordingly, it is possible to prevent obscuring of the mirror surface of the door mirror by water drops and prevent affecting the drive's view. Accordingly, it is possible to enhance the visibility during vehicle movement, improve traffic safety, and contribute to the development of sustainable transportation systems.

The above embodiments only serve to illustrate, rather than limit, the technical solutions of the disclosure. Although the disclosure has been described in detail with reference to the foregoing embodiments, those skilled in the art should understand that they may still modify the technical solutions recorded in the foregoing embodiments, or equivalently replace some or all of the technical features, and such modifications or replacements do not depart from the essence of the corresponding technical solutions within the scope of the technical solutions of the embodiments of the disclosure.

What is claimed is:

1. A door mirror rotation control device comprising:
a control part controlling drive of a motor to cause a door mirror to switch between a folded status and an unfolded status,
the control part comprising:
a motor drive controller configured to control drive of the motor; and
a motor action determination part configured to determine a drive content of the motor, wherein
the motor action determination part is configured to:
detect raindrop information during drive of the motor; and
determine the drive content of the motor as a normal action or a specific action based on whether the raindrop information is acquired, wherein compared to the normal action, a frequency of rotation changes of the motor during a period until drive of the motor ends is high in the specific action, wherein the motor drive controller is configured to control drive of the motor in the normal action or the specific action determined by the motor action determination part.

2. The door mirror rotation control device according to claim 1, wherein the drive content of the motor determined by the motor action determination part is related to a rotational speed of the motor, and the specific action comprises an action of repeatedly switching the rotational speed between high speed rotation and low speed rotation.

3. The door mirror rotation control device according to claim 1, wherein the drive content of the motor determined by the motor action determination part is related to a rotation action of the motor, and the specific action comprises an action of repeatedly switching the rotation action between rotation and stop.

4. The door mirror rotation control device according to claim 1, wherein the drive content of the motor determined by the motor action determination part is related to a rotation direction of the motor, and the specific action comprises an action of repeatedly switching the rotation direction between forward rotation and reverse rotation.

5. The door mirror rotation control device according to claim 1, wherein the drive content of the motor determined by the motor action determination part is related to a rotation action of the motor, and the specific action comprises an action of repeatedly switching the rotation action between a folding action and an unfolding action of the door mirror.

6. The door mirror rotation control device according to claim 1, wherein the control part is configured to estimate whether a vehicle will drive within a predetermined time, wherein compared to a case of driving within the predetermined time, in a case of determining that the vehicle will not drive within the predetermined time, the frequency of the rotation changes of the motor is high, or an amount of the rotation changes of the motor is large.

7. The door mirror rotation control device according to claim 1, wherein the motor action determination part is configured to:

acquire a stop duration of a vehicle; and determine drive of the motor to perform the specific action in a case where the stop duration is greater than or equal to a preset duration and the raindrop information has been acquired.

8. A door mirror rotation control method executed by a control part, the control part comprising a motor drive controller and a motor action determination part, the door mirror rotation control method comprising:

driving a motor by the motor drive controller to cause a door mirror to switch between a folded status and an unfolded status;

detecting, by the motor action determination part, raindrop information during drive of the motor;

determining, by the motor action determination part, a drive content of the motor as a normal action or a specific action based on whether the raindrop information is acquired, wherein compared to the normal action, a frequency of rotation changes of the motor during a period until drive of the motor ends is high in the specific action; and controlling, by the motor drive controller, drive of the motor in the normal action or the specific action determined by the motor action determination part.

* * * * *